(12) United States Patent
Wang et al.

(10) Patent No.: US 9,068,899 B2
(45) Date of Patent: Jun. 30, 2015

(54) PRESSURE SENSOR, OSCILLATOR, ULTRASONIC WAVE SENSOR AND MEASURING METHOD THEREOF

(71) Applicant: Lexvu Opto Microelectronics Technology (Shanghai) Ltd., Shanghai (CN)

(72) Inventors: Zhiwei Wang, Shanghai (CN); Jianhong Mao, Shanghai (CN); Lei Zhang, Shanghai (CN); Deming Tang, Shanghai (CN)

(73) Assignee: LEXVU OPTO MICROELECTRONICS TECHNOLOGY (SHANGHAI) LTD., Shanghai (CN)

( * ) Notice: Subject to any disclaimer, the term of this patent is extended or adjusted under 35 U.S.C. 154(b) by 231 days.

(21) Appl. No.: 13/905,881

(22) Filed: May 30, 2013

(65) Prior Publication Data

US 2013/0319125 A1  Dec. 5, 2013

(30) Foreign Application Priority Data

May 31, 2012  (CN) .......................... 2012 1 0177138

(51) Int. Cl.
  *G01L 9/12*  (2006.01)
  *G01L 9/00*  (2006.01)
(52) U.S. Cl.
  CPC ................. *G01L 9/12* (2013.01); *G01L 9/0045* (2013.01); *G01L 9/0073* (2013.01)

(58) Field of Classification Search
  CPC .......................................................... G01L 9/12
  See application file for complete search history.

(56) References Cited

U.S. PATENT DOCUMENTS

| | | | | |
|---|---|---|---|---|
| 5,902,933 A * | 5/1999 | Bingo et al. | ..................... | 73/724 |
| 7,265,429 B2 * | 9/2007 | Wan | ............................... | 257/415 |
| 2003/0079547 A1 * | 5/2003 | Baek | ............................... | 73/716 |
| 2009/0268369 A1 * | 10/2009 | Chen et al. | ..................... | 361/303 |
| 2012/0069422 A1 * | 3/2012 | Kaeriyama | ..................... | 359/291 |

* cited by examiner

*Primary Examiner* — Laura Martin
*Assistant Examiner* — Herbert K Roberts
(74) *Attorney, Agent, or Firm* — Harness, Dickey & Pierce, P.L.C.

(57) ABSTRACT

The present invention relates to a pressure sensor, which may include a first electrode plate, a second electrode plate, a third electrode plate, a fourth electrode plate and a fifth electrode plate, which are successively laminated on a substrate, wherein the first electrode plate, the third electrode plate and the fourth electrode plate are fixed to the substrate, the first electrode plate and the second electrode plate are disposed opposite to each other and have a gap formed therebetween, the second electrode plate is suspended over the first electrode plate to constitute a first capacitor; the second electrode plate and the third electrode plate are disposed opposite to each other and have a gap formed therebetween, to constitute a second capacitor; and the fifth electrode plate is suspended over the fourth electrode plate to constitute a third capacitor, and can move along a direction perpendicular to the substrate.

9 Claims, 4 Drawing Sheets

PRESSURE SENSOR, OSCILLATOR, ULTRASONIC WAVE SENSOR AND MEASURING METHOD THEREOF

TECHNICAL FIELD

The present disclosure generally relates to a pressure sensor, and more particularly, to a pressure sensor, an oscillator, an ultrasonic wave sensor and a measuring method thereof with hypersensitivity.

BACKGROUND

Microelectro Mechanical Systems (MEMS) is a multidisciplinary research frontier developed based on micro electronic technique, which is a technology for manufacturing microelectronic devices using semiconductor process. Compared with conventional electro-mechanical devices, MEMS devices have significant advantages of high temperature resistance, small sizes, and low power consumption. After several decades of developments, MEMS has been one of the most important scientific and technological fields of the world, which may relate to various subjects and techniques, such as electricity, mechanics, material, physics, chemistry, biology and medicine, and have a broad application prospect.

A pressure sensor is a transducer for converting a pressure signal to an electrical signal. There are mainly two types of pressure sensor according to operational principle, including resistance type and capacitive type. The capacitive pressure sensor may work to measure pressure by changing capacitance between a top electrode plate and a bottom electrode plate using pressure.

Figure 1:
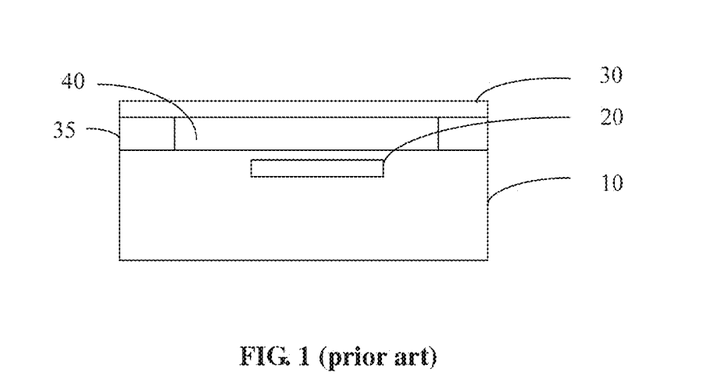
FIG. 1 schematically illustrates a cross-sectional view of a conventional pressure sensor.

FIG. 1 schematically illustrates a cross-sectional view of a capacitive pressure sensor according to a conventional art. The capacitive pressure sensor includes a substrate 10, a fixed electrode plate 20 formed in the substrate and a movable electrode plate 30 formed above the substrate 10. A cavity 40 is formed by the substrate 10, the movable electrode plate 30, together with a sealing ring 35 disposed between the substrate 10 and the movable electrode plate 30. The movable electrode plate 30 is disposed relative to the fixed electrode plate 20, which constitute a capacitor. The movable electrode plate 30 may move towards the fixed electrode plate 20 under pressure, leading to a change of a capacitance value. Thus, a pressure value may be obtained by measuring a capacitance value. However, the distance between the movable electrode plate and the fixed electrode plate is the most crucial part to the pressure sensor. Specifically, the pressure sensor would have a narrow measuring range if the distance is too small; alternatively, the pressure sensor would have a lowed measuring precision if the distance is too great.

A conventional oscillator may have a structure similar to that shown in FIG. 1. By alternately applying a forward or reverse voltage to the movable electrode plate and the fixed electrode plate, the movable electrode plate may oscillate close to or away from the fixed electrode plate. As for this type of oscillator, if the distance between the movable electrode plate and the fixed electrode plate is too great, a higher voltage is required to drive the oscillator to oscillate. But if the distance is too small, the oscillator would have a narrow oscillation range.

SUMMARY

In light of the above problems in prior art, in order to improve the precision of a pressure sensor, the pressure sensor has been improved to include multiple capacitors rather than one capacitor. Further, capacitance changes of the multiple capacitors may be positive or negative. Thus, when the pressure changes, capacitance changes of the multiple capacitors may be superimposed, which thereby increases measuring accuracy and widens the measuring range.

Embodiments of the present disclosure provide a pressure sensor, which may include a first electrode plate, a second electrode plate, a third electrode plate, a fourth electrode plate and a fifth electrode plate, which are successively laminated on a substrate including a control and reading circuit, wherein the first electrode plate, the third electrode plate and the fourth electrode plate are fixed to the substrate, the first electrode plate and the second electrode plate are disposed opposite to each other and have a gap formed therebetween, the second electrode plate is suspended over the first electrode plate to constitute a first capacitor; the second electrode plate and the third electrode plate are disposed opposite to each other and have a gap formed therebetween, which constitute a second capacitor; and the fourth electrode plate and the fifth electrode plate are disposed opposite to each other and have a gap formed therebetween, the fifth electrode plate is suspended over the fourth electrode plate to constitute a third capacitor, and the fifth electrode plate can move along a direction perpendicular to the substrate.

In some embodiments, when no external force is applied, the gap between the second electrode plate and the third electrode plate is narrower than that between the first electrode plate and the second electrode plate, and is narrower than that between the fourth electrode plate and the fifth electrode plate.

In some embodiments, a first insulation dielectric layer may be formed between the third electrode plate and the fourth electrode plate.

In some embodiments, the second electrode plate and the fifth electrode plate may include germanium-silicon, and the first insulation dielectric layer may include a silicon-containing dielectric material, such as silicon oxide, silicon nitride, silicon hydroxide and hydrocarbon oxidation silicon.

In some embodiments, the second electrode plate and the fifth electrode plate are connected to each other through a contact plug or a contact bar which is perpendicular to the substrate.

In some embodiments, a cross-sectional view of a combination of the second electrode plate, the fifth electrode plate and the contact plug or the contact bar is I-shaped.

In some embodiments, the first electrode plate has a multilayer structure including an aluminum layer and a titanium layer formed on the aluminum layer.

In some embodiments, the pressure sensor may further include a first sealing ring, a second sealing ring and a third sealing ring, wherein the first sealing ring is disposed on the substrate, the second sealing ring is disposed around a periphery of the second electrode plate, an edge of the third electrode plate is lapped on the second sealing ring, and the third sealing ring is disposed between the fourth electrode plate and the fifth electrode plate and around a periphery of the fourth electrode plate, wherein the first electrode plate, the third electrode plate, the fourth electrode plate, the fifth electrode plate, the first sealing ring, the second sealing ring and the third sealing ring constitute a cavity.

In some embodiments, the second sealing ring is formed in a same process for forming the second electrode plate, both of which include a same material and are disconnected with a gap therebetween.

In some embodiments, a second insulation dielectric layer may be formed on the fifth electrode plate, and a sixth electrode plate may be formed on the second insulation dielectric layer.

In some embodiments, a MOS device or MOS circuit may be disposed in the substrate.

In one embodiment, a pressure sensor is provided, which may include: a second electrode plate, a third electrode plate, a fourth electrode plate and a fifth electrode plate, which are successively laminated on a substrate, wherein the second electrode plate and the third electrode plate are disposed opposite to each other and have a gap formed therebetween, which constitute a first capacitor; and the fourth electrode plate and the fifth electrode plate are disposed opposite to each other and have a gap formed therebetween, which constitute a second capacitor; the third electrode plate and the fourth electrode plate are fixed to the substrate, and the second electrode plate and the fifth electrode plate are connected fixedly and can move along a direction perpendicular to the substrate.

In one embodiment, a pressure sensor is provided, which may include: a first electrode plate, a second electrode plate, a third electrode plate, a fourth electrode plate and a pressing layer, which are successively laminated on a substrate, wherein the first electrode plate and the second electrode plate are disposed opposite to each other and have a gap formed therebetween, which constitutes a first capacitor; the second electrode plate and the third electrode plate are disposed opposite to each other and have a gap formed therebetween, which constitutes a second capacitor; the third electrode plate and the fourth electrode plate are fixed to the substrate, and the second electrode plate and the pressing layer are connected fixedly and can move along a direction perpendicular to the substrate.

In one embodiment, an oscillator is provided, which may include: a first electrode plate, a second electrode plate, a third electrode plate, a fourth electrode plate and a fifth electrode plate, which are successively laminated on a substrate, wherein the first electrode plate and the second electrode plate are disposed opposite to each other and have a gap formed therebetween, the second electrode plate is suspended over the first electrode plate to constitute a first capacitor; the second electrode plate and the third electrode plate are disposed opposite to each other and have a gap formed therebetween, to constitute a second capacitor; the fourth electrode plate and the fifth electrode plate are disposed opposite to each other and have a gap formed therebetween, the fifth electrode plate is suspended over the fourth electrode plate to constitute a third capacitor; and the first electrode plate, the third electrode plate and the fourth electrode plate are fixed to the substrate, and the second electrode plate and the fifth electrode plate are connected fixedly, and can move along a direction perpendicular to the substrate; wherein when applying an alternating voltage to the second electrode plate and the third electrode plate, the second electrode plate can oscillate.

In some embodiments, the gap between the second electrode plate and the third electrode plate is narrower than that between the first electrode plate and the second electrode plate, and is narrower than that between the fourth electrode plate and the fifth electrode plate.

In one embodiment, an ultrasonic wave sensor is provided, which may include: a first electrode plate, a second electrode plate, a third electrode plate, a fourth electrode plate and a pressing layer, which are successively laminated on a substrate, wherein the third electrode plate and the fourth electrode plate are fixed to the substrate; the first electrode plate and the second electrode plate are disposed opposite to each other and have a gap formed therebetween, the second electrode plate is suspended over the first electrode plate to constitute a first capacitor; the second electrode plate and the third electrode plate are disposed opposite to each other and have a gap formed therebetween, to constitute a second capacitor; the fourth electrode plate and the pressing layer are disposed opposite to each other and have a gap formed therebetween, and the second electrode plate and the pressing layer are connected fixedly, and can move along a direction perpendicular to the substrate.

In some embodiments, the pressing layer is a fifth electrode plate, which is suspended over the fourth electrode plate to constitute a capacitor.

In one embodiment, a measuring method of an ultrasonic wave sensor is provided, which may include:

keeping a pressing layer of the ultrasonic wave sensor contacting to an object to be measured;

applying an alternating voltage to a second electrode plate and a third electrode plate during a first time period, to drive the second electrode plate and the pressing layer to oscillate simultaneously using electrostatic attraction;

transmitting an ultrasonic pressure wave towards the object through the pressing layer; and measuring an oscillating pressure signal that the object applies to the pressing layer during a second time period, wherein the oscillating pressure signal includes oscillation amplitude, frequency and phase.

In some embodiments, the oscillating pressure signal that the object applies to the pressing layer is measured through at least one variable capacity constituted by the first electrode plate and the second electrode plate, or by the second electrode plate and the third electrode plate, or by the fourth electrode plate and the pressing layer.

In some embodiments, the oscillating pressure signal that the object applies to the pressing layer is measured through a variable capacity constituted by the fifth electrode plate and the fourth electrode plate.

The pressure sensor of the present disclosure includes multiple capacitors. When performing pressure measurement, a plurality of capacitance values are obtained to calculate pressure value, which increases the measuring accuracy of the pressure sensor. Further, the pressure sensor of the present disclosure includes capacitors whose capacitance changes may be positive or negative, which further increases the measuring accuracy.

BRIEF DESCRIPTION OF THE DRAWINGS

The features of the present disclosure will be better understood from the following exemplary embodiments and the accompanying figures.

DETAILED DESCRIPTION

In order to clarify the objects, characteristics and advantages of the disclosure, the embodiments of the present disclosure will be described in detail in conjunction with the accompanying drawings.

The disclosure will be described with reference to certain embodiments. It will be understood by those skilled in the art that various changes may be made without departing from the spirit or scope of the disclosure. Accordingly, the present disclosure is not limited to the embodiments disclosed.

FIG. 2 to FIG. 9 schematically illustrate cross-sectional views of intermediate structures of a method for forming a pressure sensor according to one embodiment of the present disclosure. Hereunder, a pressure sensor according to one embodiment of the present disclosure will be described in detail with reference to FIG. 2 to FIG. 9.

Figure 2:
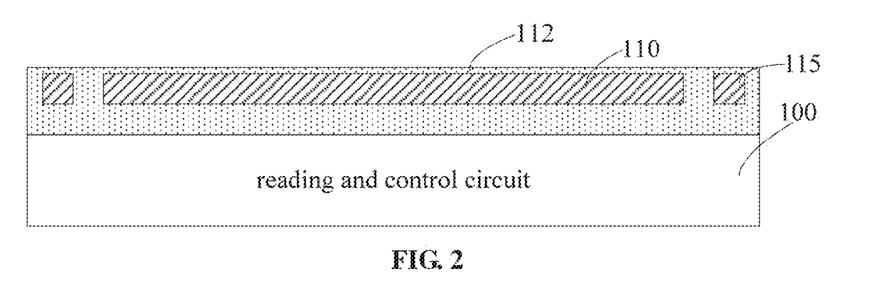
FIG. 2 to FIG. 9 schematically illustrate cross-sectional views of intermediate structures of a method for forming a pressure sensor according to one embodiment of the present disclosure.

Referring to FIG. 2, a pressure sensor may include a substrate 100 which has a MOS circuit formed therein. The MOS circuit may be a measuring circuit or a driving circuit of the pressure sensor. In this embodiment, the MOS circuit is a reading and control circuit. Firstly, a photoresist layer is coated on the substrate 100, which is processed by spinning and baking. Then, a lithographic process is performed on the substrate 100 coated by the photoresist layer. By using a patterned photoresist layer as a mask, a portion of the substrate 100 which is not covered by the photoresist layer is removed, to define a groove corresponding to a first electrode plate 110 which is disposed at the center of the substrate, and a groove corresponding to an interconnection metal layer 115 which is disposed at either side of the substrate. The groove corresponding to the interconnection metal layer 115 may be of a disconnected ring shape or other shapes. Afterwards, a chemical vapor deposition (CVD) or a physical vapor deposition (PVD) may be employed to form a thin film of titanium (Ti) at the bottom and side walls of the groove corresponding to the first electrode plate 110. The Ti thin film may have a thickness ranging from about 10 nm to about 50 nm, which serves as an adhesive to the substrate, and functions as a fine adhesion with silicon oxide and silicon-germanium alloy. Then, an Al layer is deposited on the surface of the Ti thin film by PVD. The Al layer may have a thickness ranging from about 50 nm to about 1000 nm. Both the Ti thin film and the Al layer constitute the first electrode plate 110. In some embodiments, the interconnection metal layer 115 may be formed by CVD or PVD while forming the first electrode plate 110. The material of the interconnection metal layer 115 may be the same or different from that of the first electrode plate 110. For example, the material of the interconnection metal layer 115 may include one or more materials selected from a group consisting of gold, silver, copper, aluminum, tungsten, tantalum, titanium and alloy thereof, or one of titanium nitride and tantalum nitride. In this embodiment, the first electrode plate 110 may have a multi-layer structure, for example, a two-layer structure. In some embodiments, the first electrode plate 110 may have a three-layer structure, which may include, from the bottom up, titanium at the bottom, titanium nitride in the middle and aluminum on the top. A chemical mechanical polishing (CMP) is performed on the surface of the first electrode plate 110 and the interconnection metal layer 115, so that the substrate 100 may obtain a global planarization. An insulation layer 112 is formed on the first electrode plate 110 by CVD, which may have a thickness ranging from about 10 nm to about 500 nm. Then, a CMP process is performed on the insulation layer 112. The insulation layer 112 may include silicon oxide or silicon nitride, which functions as an insulation between electrode plates.

Figure 3:
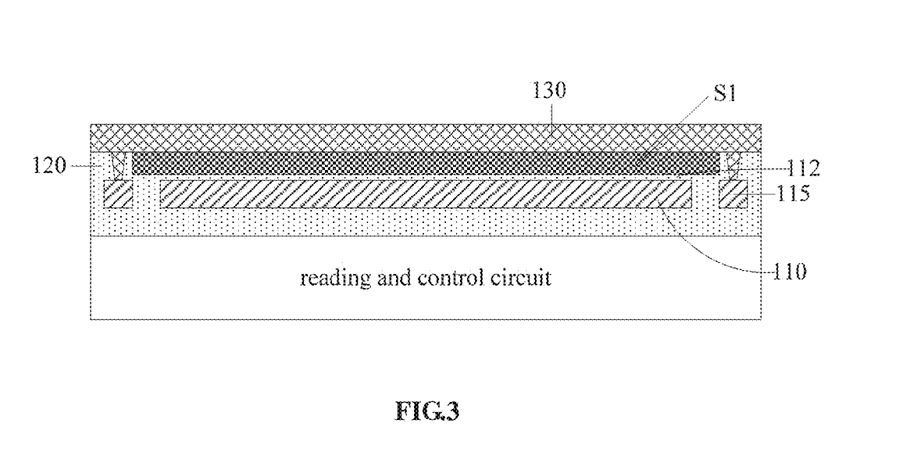

Referring to FIG. 3, a first sacrificial layer S1 is formed on the insulation layer 112 by CVD, which may have a thickness ranging from about 10 nm to about 2000 nm. Preferably, the material of the first sacrificial layer S1 may include amorphous carbon. A photoresist layer is coated on the first sacrificial layer S1, which is processed by spinning and baking. Then, a lithographic process is performed on the first sacrificial layer S1 coated by the photoresist layer. By using a patterned photoresist layer as a mask, a portion of the first sacrificial layer S1 which is not covered by the photoresist layer is removed. Specifically, a portion of the first sacrificial layer S1 on the interconnection metal layer 115 is removed. That is, the remained first sacrificial layer S1 does not completely cover the peripheral interconnection metal layer 115. A silicon oxide layer or a silicon nitride layer may be formed covering the first sacrificial layer S1 by CVD. Then, a CMP process is performed on the silicon oxide layer, which is stopped till the silicon oxide layer is flush with the first sacrificial layer S1. Thus, a first sealing ring 120 is formed on the interconnection metal layer 115. A photoresist layer is coated on the first sealing ring 120 and the first sacrificial layer S1. Then, a lithographic process is performed on the first sealing ring 120 coated by the photoresist layer. By using the patterned photoresist layer as a mask, a portion of the first sealing ring 120 which is not covered by the photoresist layer is removed. A through hole is formed on the interconnection metal layer 115 by photoetching or etching, the bottom of which is connected to the top surface of the interconnection metal layer 115. Finally, a second electrode plate 130 is formed on the first sealing ring 120 and the first sacrificial layer S1 by PVD or CVD, which has a thickness ranging from about 20 nm to about 10 µm. And a CMP process is performed to obtain a global planarization. Preferably, a thin film of insulation layer is formed on the second electrode plate 130. The material of the thin film of insulation layer may be any one known to those skilled in the art. The thin film of insulation layer is able to prevent short circuit which may be caused by the second electrode plate 130 connected with devices formed thereon. The material of the second electrode plate 130 may be germanium-silicon or a metal. In this embodiment, the second electrode plate 130 is preferably made of germanium-silicon. The distance between the first electrode plate 110 and the second electrode plate 130 is substantially equal to the thickness of the first sealing ring 120. Thus, the first electrode plate 110 and the second electrode plate 130 constitute a capacitor. The second electrode plate 130 can move along a direction perpendicular to the surface of the substrate 100.

Optionally, after polishing the first electrode plate 110 and the interconnection metal layer 115 to obtain a global planarization, an insulation layer 112 and a first sealing ring 120 may be formed while forming a thick silicon oxide layer on the first electrode plate 110 by CVD. The silicon oxide layer may have a thickness ranging from about 20 nm to about 2500 nm. The silicon oxide layer is polished using CMP. A photoresist layer is coated on the silicon oxide layer. Then, a lithographic process is performed on the silicon oxide layer coated by the photoresist layer. By using a patterned photoresist layer as a mask, a portion of the silicon oxide layer which is not covered by the photoresist layer is removed through etching, to form the insulation layer 112 and the first sealing ring 120. The removed silicon oxide layer may be thinner than the deposited silicon oxide layer. And a groove may be formed in the silicon oxide layer after the etching, which is disposed on the top of the first electrode plate 110, and does not cover the interconnection metal layer 115. Then a first sacrificial layer S1 including amorphous carbon may be formed in the groove of silicon oxide layer by CVD. The first sacrificial layer S1 is polished by using a CMP process, which is stopped till the surface of the first sealing ring 120. Afterwards, a photoresist layer is coated on the first sacrificial layer S1 and the first sealing ring 120. A lithographic process is performed on the first sealing ring 120 coated by the photoresist layer. By using a patterned photoresist layer as a mask, a portion of the silicon oxide layer on the interconnection metal layer 115 is removed, to form a through hole. The through hole is formed on the interconnection metal layer 115, and has its bottom connected to the top surface of the interconnection metal layer 115. A material of germanium-silicon is deposited on the first sacrificial layer S1 by PVD or CVD, which fills the through hole and connects to the interconnection metal layer 115. Then a CMP is performed to obtain a second electrode plate 130. The distance between the first electrode plate 110 and the second electrode plate 130 is substantially equal to the thickness of the first sealing ring 120.

Figure 4:
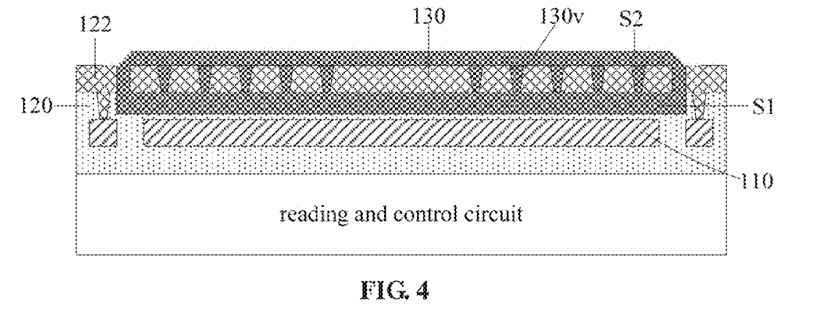

Referring to FIG. 4, a photoresist layer is coated on the second electrode plate 130. Then, a lithographic process is performed on the second electrode plate 130 coated by the photoresist layer. By using the patterned photoresist layer as a mask, a portion of the second electrode plate 130 which is not covered by the photoresist layer is removed, to form a plurality of openings 130v extending through the second electrode plate 130, allowing the first sacrificial layer S1 is exposed. In this embodiment, the number of the openings is twelve. Optionally, the openings may be formed of other number. A second sealing ring 122 is formed on the first sealing ring 120 in the same process. The second sealing ring 122 surrounds the second electrode plate 130, and is not connected to the second electrode plate 130. A second sacrificial layer S2 is formed in the openings 130v by CVD, to have a thickness ranging from about 5 nm to about 1500 nm. Preferably, the material of the second sacrificial layer S2 may include amorphous carbon. A photoresist layer is coated on the second sacrificial layer S2. Then, a lithographic process is performed on the second sacrificial layer S2 coated by the photoresist layer. By using a patterned photoresist layer as a mask, a portion of the second sacrificial layer S2 which is not covered by the photoresist layer is removed through etching. The remained portion is in the middle of the second sacrificial layer S2. During the etching, the outer edge of both sides of the second sacrificial layer S2 is also etched to form a slope with a certain angle. The second electrode plate 130 is disposed facing to the first electrode plate 120. The second electrode plate 130 is disposed between the first sacrificial layer S1 and the second sacrificial layer S2.

Figure 5:
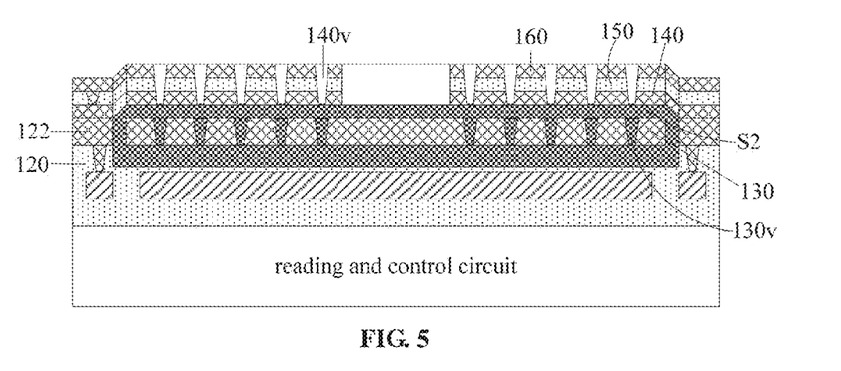

Referring to FIG. 5, a third electrode plate 140 including a metal or germanium-silicon is formed on the second sacrificial layer S2 by PVD or CVD, which may have a thickness ranging from about 20 nm to about 1000 nm. A first insulation dielectric layer 150 including silicon oxide is formed on the third electrode plate 140 by CVD, which may have a thickness ranging from about 10 nm to about 1000 nm. For example, a silicon oxide layer is formed covering the third electrode plate 140. The method for forming the silicon oxide layer is known to those skilled in the art, and is not described in detail herein. A photoresist layer is coated on the first insulation dielectric layer 150. Then, a lithographic process is performed on the first insulation dielectric layer 150 coated by the photoresist layer. By using a patterned photoresist layer as a mask, a portion of the first insulation dielectric layer 150 which is not covered by the photoresist layer is removed through etching, to obtain a through hole. The through hole extends through the first insulation dielectric layer 150, whose lower end is disposed in the third electrode plate 140. Thus, the third electrode plate 140 including germanium-silicon is exposed to the air. There is a gap between the third electrode plate 140 and the second electrode plate 130. Thus, the third electrode plate 140 and the second electrode plate 130 constitute a capacitor. The edge of the third electrode plate 140 is lapped on the second sealing ring 122, which makes the third electrode plate 140 is supported by the second electrode plate 130. The middle portion of the third electrode plate 140 suspends on the second electrode plate 130, and is facing to the second electrode plate 130. Then a fourth electrode plate 160 is formed on the first insulation dielectric layer 150 by PVD or CVD, which have a thickness ranging from about 20 nm to about 1000 nm. Preferably, the material of the fourth electrode plate 160 may include germanium-silicon. In some embodiments, an insulation layer may be formed on the fourth electrode plate 160, for example, a thin film of silicon oxide. The insulation layer may have a thickness ranging from about 10 nm to about 500 nm. The fourth electrode plate 160 may be formed covering the whole first insulation dielectric layer 150 or a portion of the first insulation dielectric layer 150. The edge of the fourth electrode plate 160 is lapped on the first insulation dielectric layer 150 corresponding to the first sealing ring 120, which functions as a support for the fourth electrode plate 160. A photoresist layer is coated on the fourth electrode plate 160. Then, a lithographic process is performed on the fourth electrode plate 160 coated by the photoresist layer. By using a patterned photoresist layer as a mask, a portion of the third electrode plate 140, the first insulation dielectric layer 150 and the fourth electrode plate 160 which is not covered by the photoresist layer is removed through etching, to obtain a plurality of openings 140v extending through the third electrode plate 140, the first insulation dielectric layer 150 and the fourth electrode plate 160. And, a contact hole is formed in the middle of the third electrode plate 140, the first insulation dielectric layer 150 and the fourth electrode plate 160, which is connected to the second sacrificial layer S2. The openings 140v is connected to the second sacrificial layer S2, and is disposed corresponding to the openings 130v. Optionally, the openings 140v may be disposed not corresponding to the openings 130v.

In some embodiments, the openings 140v may be obtained by twice etching on the fourth electrode plate 160, the first insulation dielectric layer 150 and the third electrode plate 140, respectively. It should be noted that the openings 140v may also be obtained by one etching on the fourth electrode plate 160, the first insulation dielectric layer 150 and the third electrode plate 140, respectively. Specifically, a third electrode plate 140 including a metal or germanium-silicon is formed on the second sacrificial layer S2 by PVD or CVD, which may have a thickness ranging from about 20 nm to about 1000 nm. A first insulation dielectric layer 150 including silicon oxide is formed on the third electrode plate 140 by CVD, which may have a thickness ranging from about 10 nm to about 1000 nm. A fourth electrode plate 160 is formed on the first insulation dielectric layer 150 by PVD or CVD, which have a thickness ranging from about 20 nm to about 1000 nm. Preferably, the material of the fourth electrode plate 160 may include germanium-silicon. In some embodiments, an insulation layer may be formed on the fourth electrode plate 160, for example, a thin film of silicon oxide. The insulation layer may have a thickness ranging from about 10 nm to about 500 nm. A photoresist layer is coated on the fourth electrode plate 160. Then, a lithographic process is performed on the fourth electrode plate 160 coated by the photoresist layer. By using a patterned photoresist layer as a mask, a portion of the fourth electrode plate 160, the first insulation dielectric layer 150 and the third electrode plate 140 which is not covered by the photoresist layer is removed through etching, respectively. The etching uses the second sacrificial layer S2 as an etch stop layer. Thus, a plurality of openings 140v extending through the third electrode plate 140, the first insulation dielectric layer 150 and the fourth electrode plate 160 are formed. And, a contact hole is formed in the middle of the third electrode plate 140, the first insulation dielectric layer 150 and the fourth electrode plate 160, which is connected to the second sacrificial layer S2.

Figure 6:
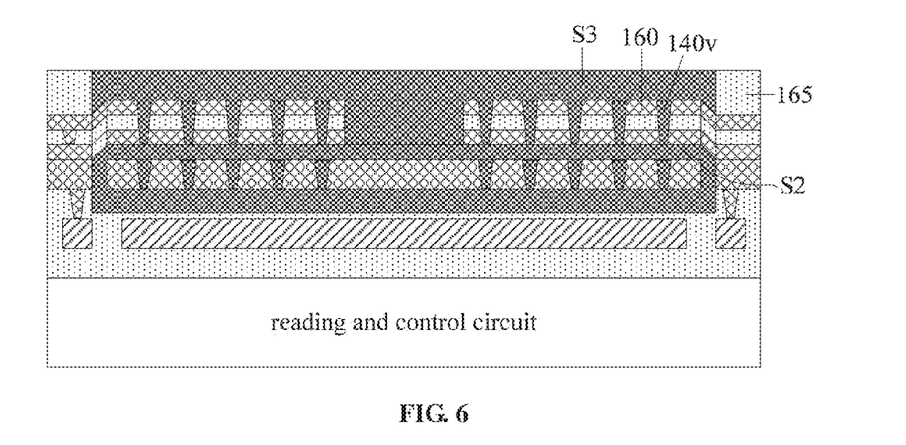

Referring to FIG. 6, a third sacrificial layer S3 is formed on the fourth electrode plate 160. Preferably, the material of the third sacrificial layer S3 may include amorphous carbon. And, the amorphous carbon is also filled into the openings 140v and the contact hole. The amorphous carbon is connected to the second sacrificial layer S2. A CMP process is performed on the third sacrificial layer S3. Then, a silicon oxide or silicon nitride layer is formed on the third sacrificial layer S3 by CVD, which is then polished by using a CMP process and using the third sacrificial layer S3 as a etch stop layer. Thus, a silicon oxide or silicon nitride layer at the edge of the third sacrificial layer S3 is formed. The silicon oxide or silicon nitride layer is disposed on the outer ring of the third sacrificial layer S3, which surrounds the third sacrificial layer S3 to form a third sealing ring 165. The third sealing ring 165 may have a thickness ranging from about 20 nm to about 1000 nm.

Figure 7:
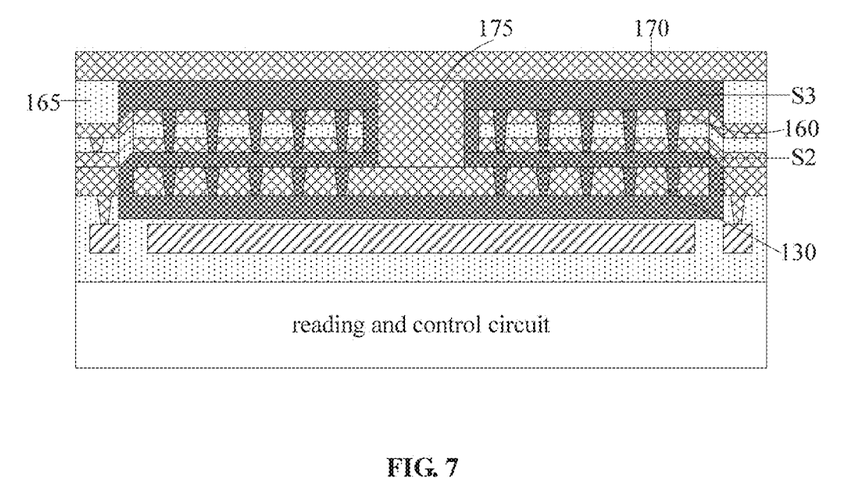

Referring to FIG. 7, a photoresist layer is coated on the third sacrificial layer S3. Then, a lithographic process is performed on the third sacrificial layer S3 coated by the photoresist layer. By using a patterned photoresist layer as a mask, a portion of amorphous carbon of the second sacrificial layer S2 and the third sacrificial layer S3 and amorphous carbon in the contact hole, which are not covered by the photoresist layer, are removed through etching. A fifth electrode plate 170 is formed on the third sacrificial layer S3 by PVD or CVD, which may have a thickness ranging from about 20 nm to about 10 μm. The material of the fifth electrode plate 170 may include a metal or germanium-silicon, preferably, germanium-silicon. A connecting plug 175 is formed in the contact hole, whose bottom surface is connected to the second electrode plate 130, and top surface is connected to the fifth electrode plate 170, which allows the second electrode plate 130 suspended with the support of the connecting plug 175, and movable with the fifth electrode plate 170. In some embodiments, the second electrode plate 130 and the fifth electrode plate 170 may be connected together or movable by another way. Finally, a CMP process is performed on the fifth electrode plate 170. There is a gap between the fifth electrode plate 170 and the fourth electrode plate 160. Thus, the fifth electrode plate 170 and the fourth electrode plate 160 constitute a capacitor. The fifth electrode plate 170 can move along a direction perpendicular to the substrate. The edge of the fifth electrode plate 170 is lapped on the third sealing ring 165. There is a gap between the middle portion of the fifth electrode plate 170 and the fourth electrode plate 160, which cause the fifth electrode plate 170 suspends on the fourth electrode plate 160. That is, the distance of the gap between the fifth electrode plate 170 and the fourth electrode plate 160 is substantially equal to the thickness of the third sealing ring 165 which ranges from about 20 nm to about 2000 nm.

Figure 8:
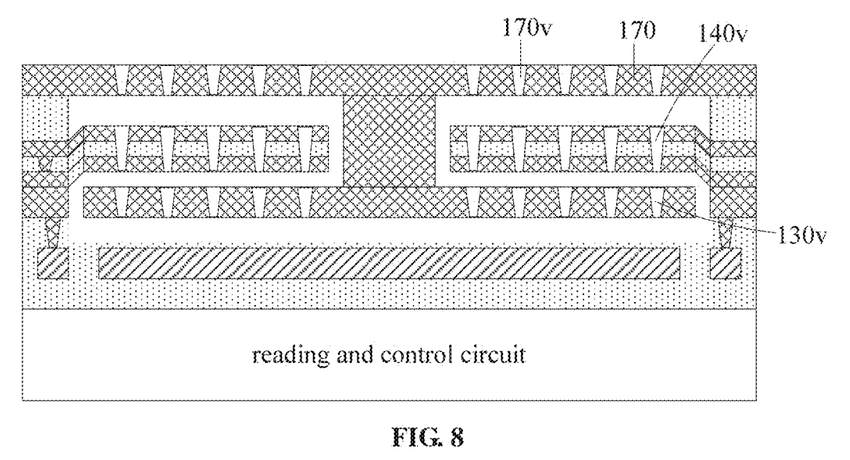

Referring to FIG. 8, a photoresist layer is coated on the fifth electrode plate 170. Then, a lithographic process is performed on the fifth electrode plate 170 coated by the photoresist layer. By using a patterned photoresist layer as a mask, a portion of the fifth electrode plate 170 which is not covered by the photoresist layer is removed through etching, to form a plurality of openings 170v. Each of the openings 170v is connected to the third sacrificial layer S3. All the first, second and third sacrificial layers including amorphous carbon are removed by using a dry etching process through the openings 170v, 140v, 130v, and the MEMS structure is released.

Figure 9:
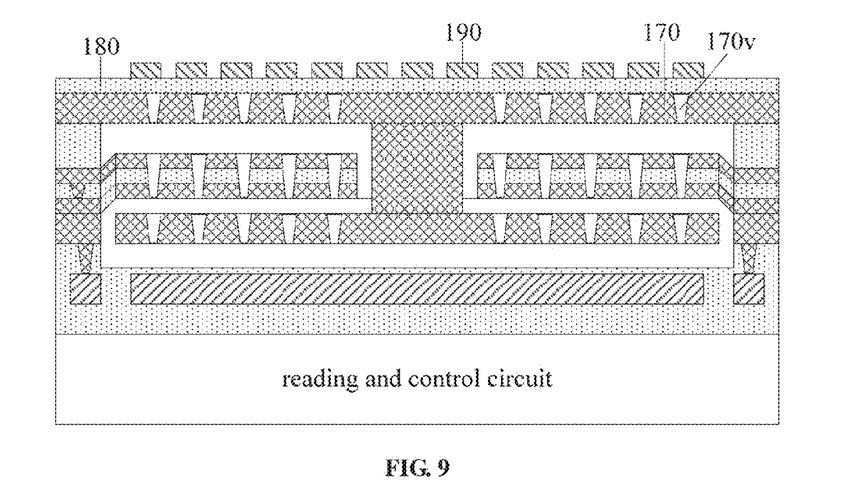

Referring to FIG. 9, a second insulation dielectric layer 180 is formed on the fifth electrode plate 170, which seals up the openings 170v. By using a semiconductor technology, a capacitive pressure sensor is obtained. Then, a sixth electrode plate 190 is formed on the second insulation dielectric layer 180, which may have a thickness ranging from about 20 nm to about 1000 nm. The material of the sixth electrode plate 190 may include silicon-germanium alloy semiconductor, aluminum, which may be a thin film including a single material, or a laminated thin film including aluminum and titanium. A CMP process is performed on the sixth electrode plate 190. Then, a photoresist layer is coated on the sixth electrode plate 190. Then, a lithographic process is performed on the sixth electrode plate 190 coated by the photoresist layer. By using a patterned photoresist layer as a mask, a portion of the sixth electrode plate 190 which is not covered by the photoresist layer is removed through etching, to obtain a resistance pressure sensor.

Figure 10:
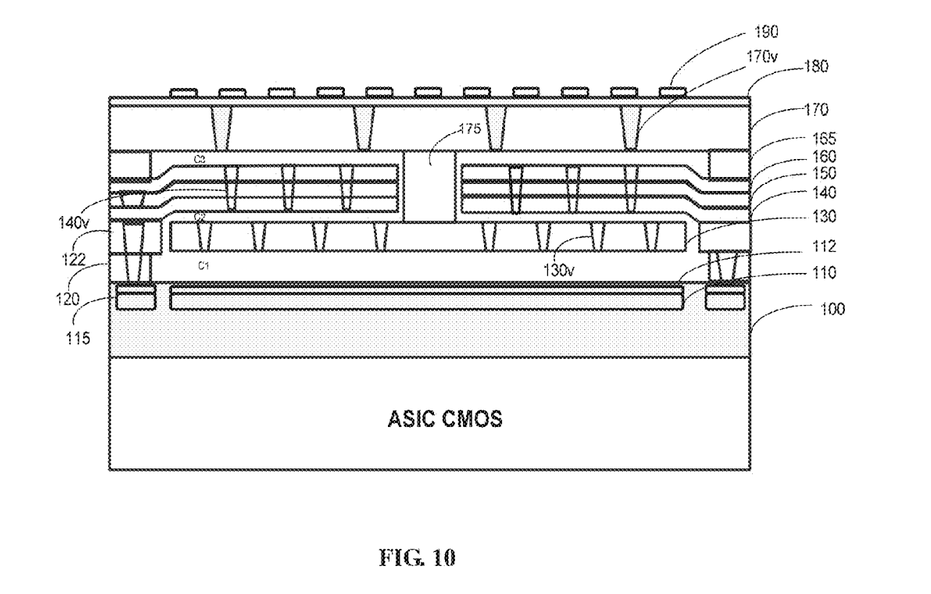
FIG. 10 schematically illustrates a cross-sectional view of a pressure sensor according to one embodiment of the present disclosure.

Referring to FIG. 10, the structure of the pressure sensor according to one embodiment of the present disclosure may be described in detail hereunder. The pressure sensor includes a substrate 100 which has a MOS circuit formed therein. The MOS circuit may be a measuring circuit or a driving circuit of the pressure sensor. The substrate 100 has a first electrode plate 110 formed thereon. The first electrode plate 110 may have an insulation layer 112 formed thereon. The insulation layer 112 may be a thin film including silicon oxide or silicon nitride, which can avoid short circuit which may be caused by a second electrode plate 130 connected with the first electrode plate 110. The insulation layer 112 may have a thickness ranging from about 10 nm to about 500 nm. The first electrode plate 110 may be made of metal material. Preferably, the first electrode plate 110 has a multi-layer structure, for example, two-layer metals, which includes an aluminum layer and a titanium layer formed on the aluminum layer. The titanium layer functions as a fine adhesion with silicon oxide and silicon-germanium alloy, which ensures a stable adhesion between the first electrode plate 110 and the insulation layer 112 thereon. The aluminum layer may have a thickness ranging from about 50 nm to about 1000 nm. The titanium layer may have a thickness ranging from about 10 nm to about 50 nm. The first electrode plate 110 may be formed by using a CVD or PVD process. An interconnection metal layer 115 may be formed at the periphery of the first electrode plate 110 during the process for forming the first electrode plate 110. The interconnection metal layer 115 may be insulated from the first electrode plate 110 by using an etching process. The interconnection metal layer 115 may be of a disconnected ring shape or other shapes.

There is a first sealing ring 120 formed on the interconnection metal layer 115. The first sealing ring 120 may include insulating medium, such as silicon oxide, silicon nitride, and so on. The first sealing ring 120 may have a thickness ranging from about 10 nm to about 2000 nm. To form the first sealing ring 120, a silicon oxide layer is formed on the first electrode plate 110 and the interconnection metal layer 115 by CVD. Then, a portion of the silicon oxide layer on the first electrode plate 110 is removed by etching. A portion of the silicon oxide layer around a periphery of the first electrode plate 110 is remained. For example, if the interconnection metal layer 115 has a ring shape surrounding the first electrode plate 110, a portion of the silicon oxide layer on the interconnection metal layer 115 may be remained to serve as the first sealing ring 120. The first sealing ring 120 surrounds the first electrode plate 110. The first sealing ring 120 may be surrounded subsequently to form a closed cavity. The thickness of the first sealing ring 120 substantially equals to the distance of the gap between the first electrode plate 110 and the second electrode plate 130. A second sealing ring 122 may be formed during the process for forming the second electrode plate 130, using a same material. And the second sealing ring 122 may include insulation material, for example, silicon oxide, silicon nitride, and so on. In some embodiments, the second sealing ring 122 have a thickness ranging from about 10 nm to about 2000 nm.

The second electrode plate 130 is suspended over the first electrode plate 110, and has a gap therebetween. Thus, the first electrode plate 110 and the second electrode plate 130 constitute a capacitor. The second electrode plate 130 can move along a direction perpendicular to the substrate 100. There is a second sealing ring 122 on the first sealing ring 120. The second sealing ring 122 surrounds the second electrode plate 130, and is disconnected with the second electrode plate 130. To form the second electrode plate 130, a sacrificial layer may be formed on the first electrode plate 110. A layer including metal or germanium-silicon is formed on the sacrificial layer by PVD or CVD. Then the second electrode plate 130 may be obtained by etching. In some embodiments, the second electrode plate 130 may have a thickness ranging from about 20 nm to about 10 μm. There are a plurality of openings 130ν formed in the second electrode plate 130, which helps to remove the sacrificial layer to form a cavity. Preferably, a thin film of insulation layer is formed on the second electrode plate 130, which prevents short circuit which may be caused by the second electrode plate 130 being connected with the third electrode plate 140 thereon.

The third electrode plate 140 is suspended over the second electrode plate 130. There is a gap between the third electrode plate 140 and the second electrode plate 130. Thus, the third electrode plate 140 and the second electrode plate 130 constitute a capacitor. The edge of the third electrode plate 140 is lapped on the second sealing ring 122, which allows the third electrode plate 140 is supported above the second electrode plate 130. The central portion of the third electrode plate 140 is suspended over the second electrode plate 130, and is facing to the second electrode plate 130. The third electrode plate 140 may be made of a metal material or germanium-silicon. In some embodiments, the third electrode plate 140 may have a thickness ranging from about 20 nm to about 1000 nm. To form the third electrode plate 140, a sacrificial layer is formed on the second electrode plate 130. Then a portion of the sacrificial layer corresponding to the second sealing ring 122 is removed by etching. A layer including metal or germanium-silicon is formed on the sacrificial layer and the second sealing ring 122 by using a CVD or PVD process. Finally, the third electrode plate 140 is obtained by using an etching process. There are a plurality of openings 140ν formed in the third electrode plate 140, which helps to remove the sacrificial layer to form a cavity. A first insulation dielectric layer 150, such as a silicon oxide layer, is formed covering the third electrode plate 140. The method for forming the first insulation dielectric layer 150 is known to those skilled in the art, and will not be described in detail herein. The openings 140ν in the third electrode plate 140 extend through the first insulation dielectric layer 150, which helps to remove the sacrificial layer subsequently to form a cavity. In some embodiments, the first insulation dielectric layer 150 may have a thickness ranging from about 10 nm to about 1000 nm. The distance between the second electrode plate 130 and the third electrode plate 140 ranges from about 5 nm to about 1500 nm.

A fourth electrode plate 160 is formed on the first insulation dielectric layer 150. The fourth electrode plate 160 may be formed covering the whole first insulation dielectric layer 150 or a portion of the first insulation dielectric layer 150. The edge of the fourth electrode plate 160 is lapped on the first insulation dielectric layer 150 corresponding to the first sealing ring 120, which functions as a support for the fourth electrode plate 160. The fourth electrode plate 160 may be formed by depositing a layer including metal or germanium-silicon by PVD or CVD. Then an etching process is performed to obtain the fourth electrode plate 160. The openings 140ν in the third electrode plate 140 extend through the fourth electrode plate 160, which helps to remove the sacrificial layer subsequently to form a cavity. In some embodiments, the fourth electrode plate 160 may have a thickness ranging from about 20 nm to about 1000 nm. There may be an insulation layer, such as a thin film of silicon oxide, formed on the fourth electrode plate 160, which prevents short circuit which may be caused by the fourth electrode plate 160 being connected with a fifth electrode plate 170 thereon. The insulation layer may have a thickness ranging from about 10 nm to about 500 nm.

There is a third sealing ring 165 formed on the fourth electrode plate 160 corresponding to the first sealing ring 120. The third sealing ring 165 includes insulation medium, such as silicon oxide, silicon nitride, and so on. The third sealing ring 165 may have a thickness ranging from about 20 nm to about 1000 nm. The third sealing ring 165 may be formed by depositing a layer of silicon oxide on the fourth electrode plate 160 using a CVD process. Then a portion of silicon oxide layer in the middle is removed by etching. A portion of silicon oxide layer around a periphery of the fourth electrode plate 160 is remained to serve as the third sealing ring 165. The third sealing ring 165 is surrounded subsequently to form a closed cavity.

A fifth electrode plate 170 is suspended over the fourth electrode plate 160. There is a gap between the fifth electrode plate 170 and the fourth electrode plate 160. Thus the fifth electrode plate 170 and the fourth electrode plate 160 constitute a capacitor. The fifth electrode plate 170 can move along a direction perpendicular to the substrate. The edge of the fifth electrode plate 170 is lapped on the third sealing ring 165. As there is a gap between the central portion of the fifth electrode plate 170 and the fourth electrode plate 160, the fifth electrode plate 170 is suspended over the fourth electrode plate 160. The distance of the gap between the fifth electrode plate 170 and the fourth electrode plate 160 substantially equals to the thickness of the third sealing ring 165, that is, from about 20 nm to about 2000 nm. To form the fifth electrode plate 170, a sacrificial layer is formed firstly on the fourth electrode plate 160. A layer including metal or germanium-silicon is formed on the sacrificial layer by using a CVD or PVD process. Finally, the fifth electrode plate 170 is obtained by using an etching process. In some embodiments, the fifth electrode plate 170 may have a thickness ranging from about 20 nm to about 10 μm. There are a plurality of openings 170ν formed in the fifth electrode plate 170, which helps to remove the sacrificial layer to form a cavity.

In some embodiments, the sacrificial layer may be made of amorphous carbon, which may be formed by CVD. In some embodiments, a Plasma Enhanced CVD (PECVD) process may be used to form a layer of amorphous carbon. The parameters of the PECVD process may include: a temperature ranging from 350° C. to 450° C., an air pressure ranging from 1 torr to 20 torr, a RF power ranging from 800 W to 1500 W, and the reaction gas including $C_3H_6$ and He, the gas flow of the reaction gas ranging from 1000 sccm to 3000 sccm, where the ratio of $C_3H_6$ to He ranging from 2:1 to 5:1. The sacrificial layer may be removed after the fifth electrode plate 170 is formed, by using an oxidation process through the openings in all the electrode plates.

In some embodiments, the second electrode plate 130 is connected to the fifth electrode plate 170 through a contact plug or a contact bar disposed in the middle, for example, the contact plug 175 in this embodiment. A cross-sectional view of a combination of the second electrode plate 130, the fifth electrode plate 170 and the contact plug is I-shaped. For example, there is a contact plug 175 disposed on the second electrode plate 130 and below the fifth electrode plate 170, for connecting the second electrode plate 130 and the fifth electrode plate 170. The contact plug 175 is separated from the third electrode plate 140, the fourth electrode plate 160 and the first insulation dielectric layer 150, so that the second electrode plate 130 is suspended by the support of the contact plug 175, and can move together with the fifth electrode plate 170. The formation of the contact plug 175 may be described as follows. Before forming the fifth electrode plate 170, an etching process is performed on a laminated structure of the third electrode plate 140, the fourth electrode plate 160 and the first insulation dielectric layer 150, to form a through hole allowing the second electrode plate 130 to be exposed. Then the hole is filled up during forming the fifth electrode plate 170, to form the contact plug 175 connecting to the second electrode plate 130. In some embodiments, the second electrode plate 130 and the fifth electrode plate 170 may be connected or move together by another way.

The pressure sensor described above includes three capacitors, the first electrode plate 110 and the second electrode plate 130 constitute a first capacitor C1, the second electrode plate 130 and the third electrode plate 140 constitute a second capacitor C2, and the fourth electrode plate 160 and the fifth electrode plate 170 constitute a third capacitor C3, wherein the first electrode plate 110, the third electrode plate 140 and the fourth electrode plate 160 are fixed, the second electrode plate 130 is connected to the fifth electrode plate 170. The second electrode plate 130 and the fifth electrode plate 170 may move simultaneously towards the substrate under pressure, which makes the distances between the electrode plates of the first capacitor C1 and the distances between the electrode plates of the third capacitor C3 become smaller, and make the distances between the electrode plates of the second capacitor C2 become greater. In this way, the pressure can be measured by superimposed calculating three capacitance values, which makes the calculating result more accurate.

Preferably, the gap between the second electrode plate 130 and the third electrode plate 140 is less than that of the first electrode plate 110 and the second electrode plate 130, and is also less than that of the fourth electrode plate 160 and the fifth electrode plate 170. Thus, the distance between the electrode plates of the first capacitor C1 and the distances between the electrode plates of the third capacitor C3 are designed to be a little greater, to increase a measuring range under great pressure. The distances between the electrode plates of the second capacitor C2 becomes greater gradually, so the distances between the electrode plates of the second capacitor C2 is designed to be smaller. Accordingly, a small pressure value which can not be measured by the first capacitor C1 and the third capacitor C3, can be measured by means of the second capacitor C2, which thereby increases the measuring range compared to the conventional art using only one capacitor.

A second insulation dielectric layer 180 may be formed on the fifth electrode plate 170. And there is a sixth electrode plate 190 formed on the second insulation dielectric layer 180. When applying a pressure to the pressure sensor, the sixth electrode plate 190 may bend as there is a cavity under the fifth electrode plate 170, which makes the resistance of the sixth electrode plate 190 vary accordingly. Thus, a pressure value can be measured according to the change of the resistance of the sixth electrode plate 190. By combining a pressure value measured by the sixth electrode plate 190 and a pressure value measured by the first electrode plate 110, the second electrode plate 130, the third electrode plate 140, the fourth electrode plate 160 and the fifth electrode plate 170 to obtain a final pressure value, which makes the measurement more accurate. In some embodiments, the sixth electrode plate 190 may have a thickness ranging from about 20 nm to about 1000 nm. The material of the sixth electrode plate 190 may include silicon-germanium alloy semiconductor, aluminum, which may be a thin film including a single material, or a laminated thin film including aluminum and titanium.

The pressure sensor described above may also serve as an oscillator. As the distance between the second electrode plate 130 and the third electrode plate 140 is small, the second electrode plate 130 can oscillate even applying a small voltage to the electrodes. Thus, the oscillator can work under low voltage. In this way, the first capacitor C1 constituted by the first electrode plate 110 and the second electrode plate 130, and the third capacitor C3 constituted by the fourth electrode plate 160 and the fifth electrode plate 170 can work under a higher voltage range, allowing the oscillator work. And the second capacitor C2 constituted by the second electrode plate 130 and the third electrode plate 140 can work under a lower voltage range, allowing the oscillator work. That is, the oscillator according to the present disclosure can meet the requirements of operation under both high voltage and low voltage.

In one embodiment, an ultrasonic wave sensor is provided including the above structures. The ultrasonic wave sensor may include a first electrode plate, a second electrode plate, a third electrode plate, a fourth electrode plate and a pressing layer, which are formed successively laminated on a substrate. The third electrode plate and the fourth electrode plate are fixed to the substrate. The first electrode plate is facing to the second electrode plate, and there is a gap between the first electrode plate and the second electrode plate. The second electrode plate is suspended over the first electrode plate, both of which constitute a capacitor. The second electrode plate is facing to the third electrode plate, and there is a gap between the second electrode plate and the third electrode plate. The second electrode plate and the third electrode plate also constitute a capacitor. The fourth electrode plate is facing to the pressing layer, and there is a gap between the fourth electrode plate and the pressing layer. The fourth electrode plate and the pressing layer are connected fixedly, and can move simultaneously along a direction perpendicular to the substrate.

The pressing layer is a fifth electrode plate, which is suspended over the fourth electrode plate to constitute a capacitor.

A measuring method of the ultrasonic wave sensor may include:

contacting the ultrasonic wave sensor to an object to be measured;

applying an alternating voltage to the second electrode plate and the third electrode plate during a first time period, to drive the second electrode plate and the pressing layer to oscillate;

transmitting an ultrasonic pressure wave to the object to be measured through the pressing layer; and measuring an oscillating pressure signal that the object applies to the pressing layer during a second time period, wherein the oscillating pressure signal includes oscillation amplitude, frequency and phase.

The oscillating pressure signal that the object applies to the pressing layer can be measured through at least one variable capacity constituted by the first electrode plate and the second electrode plate, or by the second electrode plate and the third electrode plate.

Optionally, the oscillating pressure signal that the object applies to the pressing layer can be measured through a variable capacity constituted by the fifth electrode plate and the fourth electrode plate. As the distance between the second capacitor C2 becomes greater gradually, its distance may be designed very small. Thus, the capacitor C2 can oscillate to generate ultrasonic wave even applying very low voltage to its two electrode plates. The transmitted ultrasonic wave is reflected by an object to the ultrasonic wave sensor. At this time, the ultrasonic wave sensor can receive the reflected ultrasonic wave as a pressure sensor. Thus, an electric energy can be transformed into an ultrasonic wave mutually using a piezoelectric effect. That is, an electric energy is transformed into an ultrasonic wave for transmission. While the backward ultrasonic wave is received, the oscillation of the ultrasonic wave may be transform into an electric energy. In this way, a transmission and reception of the sonic wave can be realized.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A pressure sensor, comprising:
a first electrode plate, a second electrode plate, a third electrode plate, a fourth electrode plate and a fifth electrode plate, which are successively laminated on a substrate comprising a control and reading circuit, wherein the first electrode plate, the third electrode plate and the fourth electrode plate are fixed to the substrate, the first electrode plate and the second electrode plate are disposed opposite to each other and have a gap formed therebetween, the second electrode plate is suspended over the first electrode plate to constitute a first capacitor; the second electrode plate and the third electrode plate are disposed opposite to each other and have a gap formed therebetween, which constitute a second capacitor; and the fourth electrode plate and the fifth electrode plate are disposed opposite to each other and have a gap formed therebetween, the fifth electrode plate is suspended over the fourth electrode plate to constitute a third capacitor, and the fifth electrode plate can move along a direction perpendicular to the substrate; and a first sealing ring, a second sealing ring and a third sealing ring, wherein the first sealing ring is disposed on the substrate, the second sealing ring is disposed around a periphery of the second electrode plate, an edge of the third electrode plate is lapped on the second sealing ring, and the third sealing ring is disposed between the fourth electrode plate and the fifth electrode plate and around a periphery of the fourth electrode plate, wherein the first electrode plate, the third electrode plate, the fourth electrode plate, the fifth electrode plate, the first sealing ring, the second sealing ring and the third sealing ring constitute a single continuous cavity, collectively.

2. The pressure sensor according to claim 1, wherein when no external force is applied, the gap between the second electrode plate and the third electrode plate is narrower than that between the first electrode plate and the second electrode plate, and is narrower than that between the fourth electrode plate and the fifth electrode plate.

3. The pressure sensor according to claim 1, wherein the second electrode plate and the fifth electrode plate are connected to each other through a contact plug or a contact bar which is perpendicular to the substrate.

4. The pressure sensor according to claim 3, wherein a cross-sectional view of a combination of the second electrode plate, the fifth electrode plate and the contact plug or the contact bar is I-shaped.

5. The pressure sensor according to claim 1, wherein the second sealing ring is formed in a same process for forming the second electrode plate, both of which comprise a same material and are disconnected with a gap therebetween.

6. The pressure sensor according to claim 1, wherein a second insulation dielectric layer is formed on the fifth electrode plate, and a sixth electrode plate is formed on the second insulation dielectric layer.

7. A pressure sensor, comprising:
a second electrode plate, a third electrode plate, a fourth electrode plate and a fifth electrode plate, which are successively laminated on a substrate, wherein the second electrode plate and the third electrode plate are disposed opposite to each other and have a gap formed therebetween, which constitutes a first capacitor; and the fourth electrode plate and the fifth electrode plate are disposed opposite to each other and have a gap formed therebetween, which constitutes a second capacitor; the third electrode plate and the fourth electrode plate are fixed to the substrate, and the second electrode plate and the fifth electrode plate are connected fixedly and can move simultaneously along a direction perpendicular to the substrate; and a first sealing ring, a second sealing ring and a third sealing ring, wherein the first sealing ring is disposed on the substrate, the second sealing ring is disposed around a periphery of the second electrode plate, an edge of the third electrode plate is lapped on the second sealing ring, and the third sealing ring is disposed between the fourth electrode plate and the fifth electrode plate and around a periphery of the fourth electrode plate, wherein the third electrode plate, the fourth electrode plate, the fifth electrode plate, the first sealing ring, the second sealing ring and the third sealing ring constitute a single continuous cavity, collectively.

8. An oscillator, comprising:
a first electrode plate, a second electrode plate, a third electrode plate, a fourth electrode plate and a fifth electrode plate, which are successively laminated on a substrate, wherein the first electrode plate and the second electrode plate are disposed opposite to each other and have a gap formed therebetween, the second electrode plate is suspended over the first electrode plate to constitute a first capacitor; the second electrode plate and the third electrode plate are disposed opposite to each other and have a gap formed therebetween, which constitutes a second capacitor; the fourth electrode plate and the fifth electrode plate are disposed opposite to each other and have a gap formed therebetween, the fifth electrode plate is suspended over the fourth electrode plate to constitute a third capacitor; and the first electrode plate, the third electrode plate and the fourth electrode plate are fixed to the substrate, and the second electrode plate and the fifth electrode plate are connected fixedly, and can move simultaneously along a direction perpendicular to the substrate; wherein when applying an alternating voltage to the second electrode plate and the third electrode plate, the second electrode plate can oscillate; and a first sealing ring, a second sealing ring and a third sealing ring, wherein the first sealing ring is disposed on the substrate, the second sealing ring is disposed around a periphery of the second electrode plate, an edge of the third electrode plate is lapped on the second sealing ring, and the third sealing ring is disposed between the fourth electrode plate and the fifth electrode plate and around a periphery of the fourth electrode plate, wherein the first electrode plate, the third electrode plate, the fourth electrode plate, the fifth electrode plate, the first sealing ring, the second sealing ring and the third sealing ring constitute a single continuous cavity, collectively.

9. The oscillator according to claim 8, wherein the gap between the second electrode plate and the third electrode plate is narrower than that between the first electrode plate and the second electrode plate, and is narrower than that between the fourth electrode plate and the fifth electrode plate.

* * * * *